United States Patent
Leukes et al.

[11] Patent Number: 5,945,002
[45] Date of Patent: Aug. 31, 1999

[54] METHOD OF PRODUCING SECONDARY METABOLITES

[75] Inventors: Winston Daniel Leukes, Grahamstown; Edmund Petrus Jacobs, Stellenbosch; Peter Dale Rose; Stephanie Gail Burton, both of Grahamstown; Ronald Douglas Sanderson, Stellenbosch, all of South Africa

[73] Assignee: Water Research Committe, Pretoria, South Africa

[21] Appl. No.: 08/705,624

[22] Filed: Aug. 30, 1996

[30] Foreign Application Priority Data

Sep. 1, 1995 [ZA] South Africa ............................. 95/7366

[51] Int. Cl.$^6$ .................................................. B01D 61/00
[52] U.S. Cl. .................... 210/651; 210/500.23; 210/615; 435/31; 435/71.1
[58] Field of Search ...................................... 210/611, 640, 210/500.23, 651, 615; 435/31, 4, 71.1; 604/50

[56] References Cited

U.S. PATENT DOCUMENTS

| | | | |
|---|---|---|---|
| 4,554,075 | 11/1985 | Chang et al. | 210/611 |
| 4,655,926 | 4/1987 | Chang et al. | 20/611 |
| 4,705,503 | 11/1987 | Dormah et al. | 604/50 |
| 4,948,728 | 8/1990 | Stephanopoulos et al. | 435/31 |
| 4,988,443 | 1/1991 | Michaels et al. | 210/611 |
| 5,232,601 | 8/1993 | Chu et al. | 540/500.23 |
| 5,342,765 | 8/1994 | Irvine et al. | 435/71.1 |
| 5,622,819 | 4/1997 | Herman | 435/4 |

FOREIGN PATENT DOCUMENTS

WO93/06045  4/1993  WIPO .

OTHER PUBLICATIONS

Patent Abstracts of Japan, vol. 13, No. 151 (C–584), Apr. 12, 1989.

European Search Report for EP 96 30 6333 dated Feb. 20, 1998.

M.A. Siebel, "Attached growth reactors" *Bioreaction Design and Product Yield,* Butterworth–Heinemann, London, Chapter 8 (1992).

A.Trilli "Kenetics of secondary metabolite production" *Microbial Growth Dynamics* (Poole R.K. et al—Eds.) IRL Press, Oxford England (1990).

R. Venkatadri et al. "Cultivation of Phanerochaete Chrysosporium and Production of Lignin Peroxidase in Novel Biofilm Reactor Systems: Hollow Fiber Reactor and Silicone Membrane Reactor", *Wat. Res.* vol. 27, No. 4, pp. 591–596, (1993).

*Primary Examiner*—Ana Fortuna

[57] ABSTRACT

A method of producing a secondary metabolites comprises providing a porous substratum which has a biofilm of micro-organism attached thereto, and causing a nutrient solution to flow through the substratum, at a rate which is sufficiently low for a nutrient gradient to be established across the biofilm, such that the nutrient concentration at a high level along the gradient is sufficiently high to support primary growth of the micro-organism, and the nutrient concentration at low level along the gradient being sufficiently low to induce secondary growth of the micro-organism, thereby to produce secondary metabolite. The substrate is in the form of a hollow fibre membrane having a relatively thin, porous skin on the inside, and a relatively thick, finger-like, externally unskinned void structure radiating outwardly from the skin.

18 Claims, 7 Drawing Sheets

A

B

METHOD OF PRODUCING SECONDARY METABOLITES

BACKGROUND OF THE INVENTION

THIS INVENTION relates to a method of producing secondary metabolites, and also to the treatment of waste water in a bioreactor by utilising the capability of certain micro-organisms to produce secondary metabolites.

In the presence of a nutrient solution of sufficiently high concentration, most micro-organisms exhibit exponential growth. This is also referred herein to as primary growth. As the concentration of the nutrient solution falls, the micro-organisms, in response to the stress caused by nutrient starvation, switch to what is referred herein to as secondary metabolism in which they start to produce secondary metabolites.

Certain secondary metabolites have useful properties. *Phanerochaete chrysosporium*, for example, is a filamentous fungus capable of degrading a wide range of recalcitrant aromatic pollutants. These compounds include BTEX (Benzene, Toluene, Ethylbenzene and Xylene) type compounds, DDT, TCDD (2,3,7,8-tetrachlorodibenzo-p-dioxin), benzo(a)pyrene, Lindane and certain PCB congeners. This organism has thus been considered a candidate for the bioremediation of waste waters containing such pollutants.

This degradative ability is due in part to the secretion, during secondary metabolism initiated by nutrient limiting conditions, of a group of $H_2O_2$-producing oxidases as well as a group of peroxidases called lignin peroxidases (LiP). In whole cell cultures, however, a certain amount of biodegradation of these compounds occurs independently of the secretion of these enzymes.

Several problems have been encountered in attempting to achieve efficient production of the ligninolytic enzymes from this fungus, and in employing the fungus for waste water treatment making use of conventional bioreactor technology. Existing methods of producing secondary metabolites for extended periods of time are normally sequential batch processes. The processes are often slow and the yields low, and difficulties have been experienced in attempting to upscale the processes for large-scale commercial use. In each cycle of the batch process there is a long lag phase. Thereafter there is a primary growth phase lasting approximately 3 days, after which the secondary metabolism commences. The enzymes of interest are normally produced after 5 days, and production normally ceases after 7 days. After approximately 8 days the micro-organisms start to produce spores and die.

It is an object of the present invention to provide a method of producing secondary metabolites which can operate on a continuous basis.

SUMMARY OF THE INVENTION

According to the invention there is provide a method of producing a secondary metabolite, which method comprises:

providing a porous substratum which has a biofilm of micro-organism attached thereto;

causing a nutrient solution to flow through the substratum, at a rate which is sufficiently low for a nutrient gradient to be established across the biofilm, such that the nutrient concentration at a high level along the gradient is sufficiently high to support primary growth of the micro-organism, and the nutrient concentration at a low level along the gradient is sufficiently low to induce secondary metabolism of the micro-organism, thereby to produce secondary metabolite.

The substratum may be in the form of a hollow fibre membrane, with the biofilm being on the outside of the membrane.

The hollow fibre membrane may have a relatively thin, porous skin on the inside, and a relatively thick, finger-like, externally unskinned void structure radiating outwardly from the skin. It may have an outside diameter of about 2 mm, a porous skin having a thickness of about 1 $\mu$m and a void structure having a thickness of about 300 $\mu$m.

The outside of the biofilm may be contacted with an oxygen-containing gas to provide oxygen for metabolism. The oxygen-containing gas may be air.

The oxygen-containing gas may be blown over the outside surface of the biofilm, to carry away spores and dead cells of the micro-organism.

The micro-organism may be a filamentous fungus. The filamentous fungus may be *Phanerochaete chrysosporium*.

Further according to the invention there is provided a method of treating nutrient-containing waste water containing organic pollutants, through the activity of secondary metabolites, which method comprises:

providing a porous substratum which has a biofilm of micro-organism attached thereto;

causing the waste water to flow through the substratum, at a rate which is sufficiently low for a nutrient gradient to be established across the biofilm, such that the nutrient concentration at a high level along the gradient is sufficiently high to support primary growth of the micro-organism, and the nutrient concentration at a low level along the gradient is sufficiently low to induce secondary metabolism of the micro-organism, thereby to produce secondary metabolite.

The invention will now be described in more detail, by way of example, with reference to the accompanying diagrammatic drawings.

DETAILED DESCRIPTION OF PREFERRED EMBODIMENTS

Figure 1:
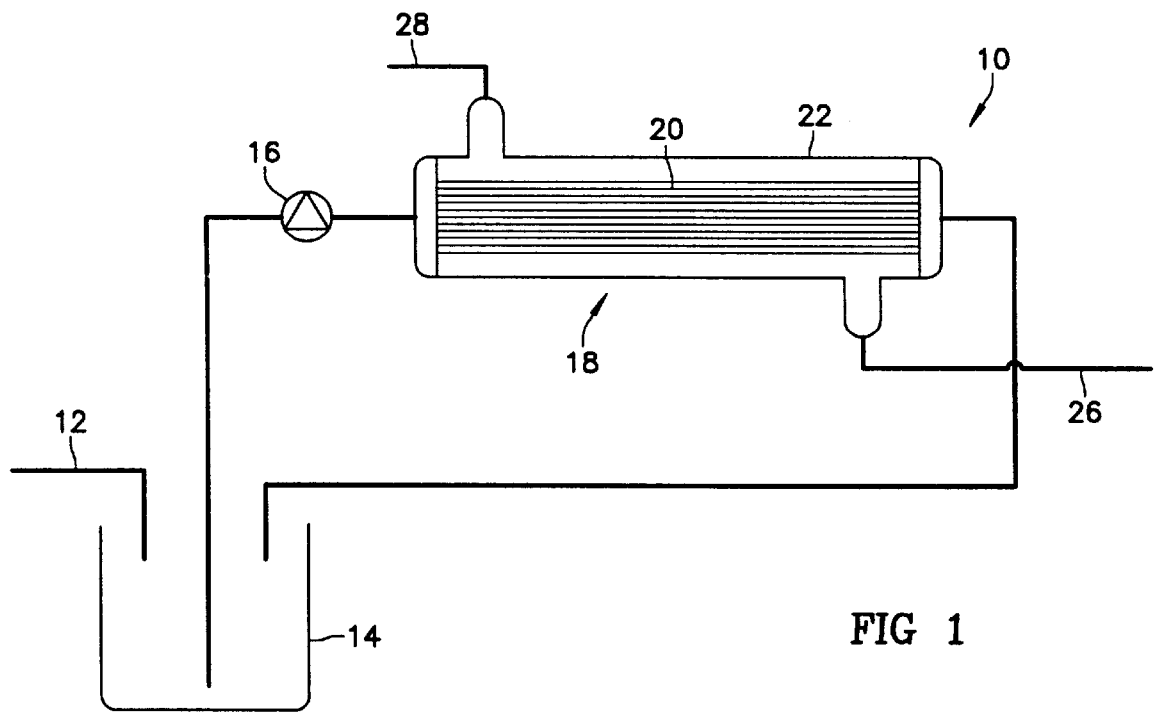
FIG. 1 shows a bioreactor installation for the continuous treatment of waste water by the passage of the waste water through a biofilm.
Figure 2:
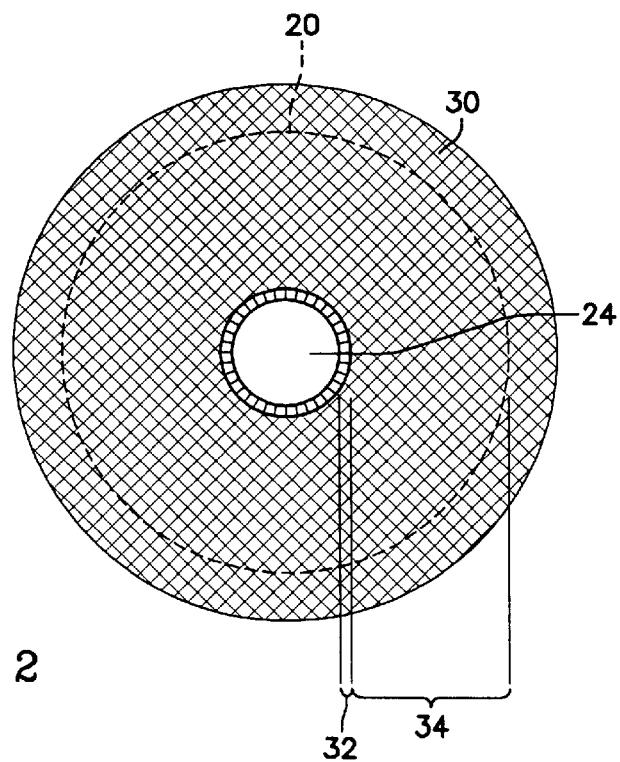
FIG. 2 is a cross-section of a hollow fibre membrane which is used in the bioreactor to support the biofilm.

Referring now to the drawings in more detail, reference numeral 10 generally indicates a waste water treatment installation in which waste water that is to be treated is fed via a line 12 into a reservoir 14. The waste water is withdrawn from the reservoir and pumped by means of a pump 16 through a hollow fibre membrane bioreactor 18. The membrane bioreactor 18 comprises a large number of capillary, hollow fibre membranes 20 enclosed in a shell 22. The waste water passes through the capillary lumen 24 of the hollow fibre membranes 20, from one end thereof to the other. Waste water exiting from the other end of the hollow fibre membranes 20 is returned to the reservoir 14 for recirculation.

Some of the waste water permeates through the membranes 20 and collects in the extra-capillary space of the bioreactor, from where it is drained through an outwash line 26.

The extra-capillary space of the bioreactor 18 is ventilated by means of air which is blown into the shell via an air inlet 28, and leaves the shell together with the permeate via the outwash line 26.

To ready the bioreactor 18 for production, the hollow fibre membranes 20 are inoculated with a suitable microorganism such as *P. chrysosporium*. This can be done by means of reverse filtration, i.e. by establishing a reverse flow of water through the membrane, the water carrying spores of the micro-organism in suspension. A period is then allowed for attachment of the organism to the membrane. Once this has taken place, the bioreactor is ready for use.

The waste water contains nutrient which supports growth of the micro-organism. As a consequence, a biofilm 30 of immobilised micro-organism develops on the outside of the membrane 20. The membrane 20 may be a polysulphone or polyethersulphone ultrafiltration membrane having a porous skin 32 on the inside and a void structure 34 consisting of finger-like voids which radiate outwardly from the skin. The membrane 20 will typically have a diameter of 2 mm, the skin 32 a thickness of about 1 $\mu$m, and the void structure 34 a thickness of up to 300 $\mu$m. Such membranes are described in co-pending U.S. patent application Ser. No. 08/659,744 filed Jun. 6, 1996 (Jacobs and Sanderson) the disclosure of which is incorporated herein by reference. The void structure 34 forms open passages which are many times larger in cross-section than the pores in the skin 32. This allows a relatively thick biofilm of approximately 300 $\mu$m to develop on the membrane 20, the biofilm being firmly attached to the membrane.

The flow of permeate through the membrane should be low enough so that a nutrient gradient is established across the biofilm. Near the lumen 24 of the membrane the nutrient concentration should be high enough to support primary growth of the biofilm population, whereas, towards the outside of the biofilm, the nutrient concentration should drop to a level which causes the biofilm population to switch to secondary metabolism, thereby resulting in the production of secondary metabolites.

As new biomass is laid down, older cells are displaced outward until they are shed from the outside surface of the biofilm. As the cells move from the inside of the biofilm to the outside they move from an environment that is nutrient-rich and thus supports primary growth, to an environment that is nutrient-poor and causes the micro-organism to switch to secondary metabolism and thus leads to the production of secondary metabolites. The process is stable and steady-state, and can thus be operated on a continuous basis. Also, the thickness of the biofilm and immobilisation of the organism may contribute to the rate of secondary metabolite production being high.

The air that is blown through the bioreactor shell serves to supply the oxygen that is required for viability of the biofilm, and also to carry away spores and dead cells that are shed from the outer surface of the biofilm.

The process that is illustrated in the drawings leads to a treated waste water effluent in the outwash line 26, the secondary metabolites that are produced serving to degrade pollutants in the waste water. However, it will be appreciated that the process can also be used for the specific purpose of producing a valuable secondary metabolite product. It this event a nutrient solution is passed through a bioreactor and permeate containing the secondary metabolite product drawn off via the outwash line of the reactor.

Experimental Results

A membrane bioreactor system was developed for the continuous production of LiP high levels while maintaining a high biomass density. The objective was to determine some of the factors influencing the performance of the system in removing cresol from a synthetic effluent. Cresol was used as a model pollutant since it is a simple example of a phenolic compound and cresylic effluents are fairly common in many industries.

The membrane reactor was operated as a gradostat for continuous secondary metabolite production. This involved inoculating the reactor with fungal spores onto a membrane with an annular wall morphology as described in the aforesaid co-pending patent application. The reactor was perfused with growth medium from the lumen to the extra-capillary space. Humidified air was supplied to the extra capillary space of the membrane reactor to provide the developing biofilm with the required oxygen, to provide a relatively high shear environment in order to slough off dead biomass from biofilm immobilised on the membrane and to wash out the effluent from the reactor. This resulted in the development of a dense, thick, continuous biofilm on the membrane.

Diffusional nutrient gradients were allowed to establish radially across the biofilm. These gradients result from the depletion of nutrients from the growth medium as it perfuses the biofilm. This results in the biomass closest to the lumen residing in a nutrient-rich environment while the biomass radially distant from the lumen of the capillary membrane experiences nutrient deficient conditions such that this biomass switches to secondary metabolism and produces the ligninolytic enzymes. This biomass eventually dies or sporulates and is sloughed off the outside of the biofilm. Thus a zone of new biomass is continuously formed at the lumen end of the biofilm, while a zone of biomass is always producing ligninolytic enzymes and the dead biomass and spores are being continuously sloughed of. This leads to steady state dynamic equilibrium which can be maintained for long periods of time.

Initial studies showed that the predominant factor affecting the rate of removal of cresol, a model aromatic compound, from a synthetic growth medium, is transmembrane flux of the medium. This phenomenon is believed to be not just a simple function of the residence time of the cresol in the biofilm, but a complex interaction of several factors.

A transverse flow, high volumetric mass transfer coefficient, biological contactor, was then developed, having the following features:

(1) A large number of hollow fibre membranes, completely separate from each other, can be configured in a small volume reactor. The fact that the membranes are not in contact with each other is important for proper biofilm differentiation on each membrane.

(2) The membranes are arranged in a mutually perpendicular configuration, with separate fluid supply channels for each direction, allowing flexibility in terms of feed supply and product extraction.

(3) Despite the large amount of membrane surface area made available, the individual membranes are sufficiently short to prevent Starling Flow conditions which would adversely affect the system.

(4) Air can be supplied transversely to the membranes, providing good mass transfer without having to resort to high pressures or high flow velocities as would be the case with axial flow systems.

*Phanerochaete chrysosporium* DSM 1556 (equivalent to ATCC 34541) was used. The growth medium used was similar to that used by Tien and Kirk [Tien, M and Kirk, T K (1988). Lignin Peroxidase of *Phanerochaete chrysosporium*. Methods Enzymology 161 pp. 238–249] except that veratryl alcohol was excluded.

The membranes used were externally unskinned polysulphone capillaries as described in the aforementioned co-pending patent application. Using these membranes an internal surface area (for ultrafiltration) of 0.0092 $m^2$ is available in a reactor volume of 36 $cm^3$.

Before use the reactors were sterilised with formaldehyde and rinsed with sterile distilled water. The reactors were inoculated with a suspension of spores and homogenised mycelia. These were obtained by washing of agar slants containing sporulation medium (as described by Tien and Kirk) inoculated 7 days previously. Growth medium was recirculated through both channels of the reactor for four days until LiP production was observed. Thereafter cresol was added to fresh growth medium and recirculated through the reactors. The two reactors were operated as follows:

Reactor 1: High flux Reactor 2: Low Flux

Samples were collected from the emerging effluent as well as from the recirculating medium at the same time as a control. These were assayed for P-cresol concentration as well as pH and relative redox potential. Samples were also taken from the effluent of the reactor 24 hours after emergence and assayed for p-cresol concentration.

p-Cresol was determined using a Beckman System Good HPLC unit with Beckman System Gold Software for chromatographic analysis. A reverse phase Machery-Nagel Nucleosil $5\mu$ column was used with water:acetonitrile (6:4) as the mobile phase at a flow rate of 1 ml/min. p-Cresol was detected on a Diode Array UV-Detector at 254 nm. Assays were performed in duplicate and the averages were used.

The reactors were operated for a total of 160 hours. Cresol degradation trials commenced after 96 hours of operation after which a suitable biofilm would have established.

Figure 3:
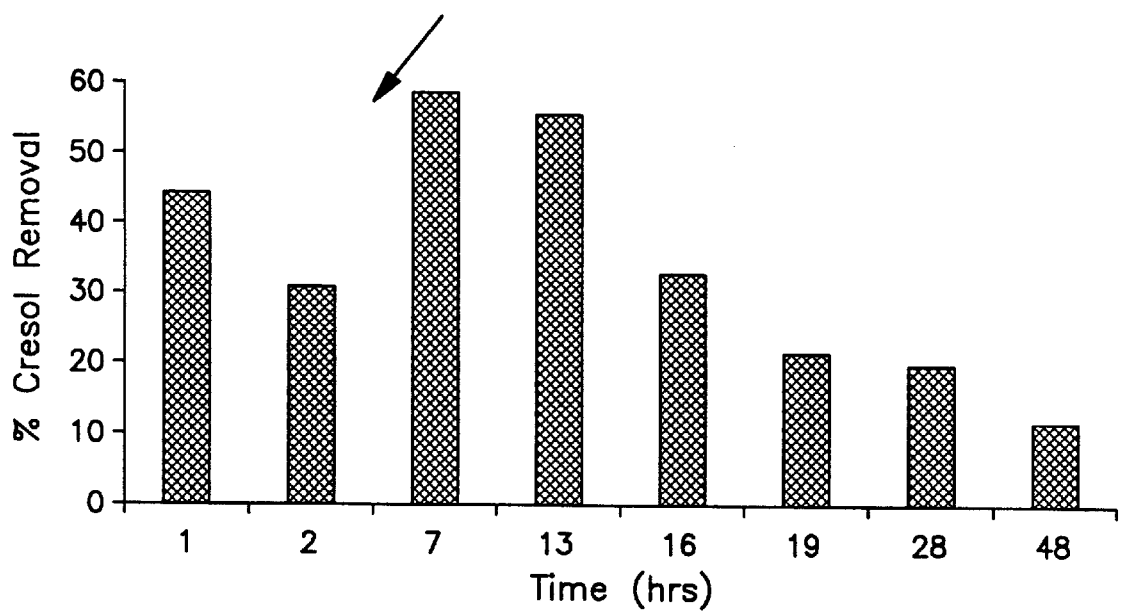
FIGS. 3 to 13 are plots of various experimental results.
Figure 4:
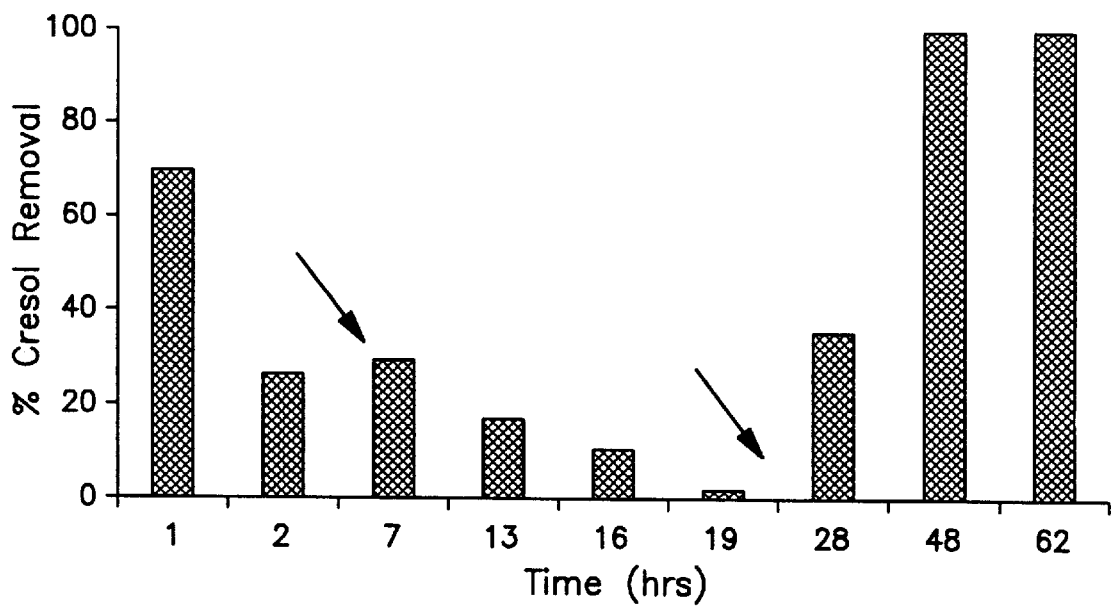

Reactor performance was judged in terms of efficiency, which is defined herein as the reduction of cresol concentration in the medium after a single pass through the biofilm expressed as percentage removal of cresol from the recirculation medium. Reactor performance is also expressed in terms of productivity, which is defined as the amount in mg. of cresol removed per unit time. The efficiency of Reactor 1 is shown in FIG. 3 and that of Reactor 2 in FIG. 4, being plots of % cresol removal against time (in hours). The arrows indicate when a fresh medium reservoir containing cresol was attached. Times indicated are after p-cresol addition.

The maximum efficiency of cresol degradation achieved in Rector 1 was 52% removal in a single pass through the reactor. The efficiency was maintained for approximately 6 hours before a sharp decrease in efficiency can be observed. It can also be seen that the maximum efficiency was achieved shortly after fresh growth medium was supplied.

Similar trends were observed in Reactor 2. Maximum cresol removal efficiency, 100% maintained for approximately 20 hours in this case, was achieved shortly after a medium change. Reactor productivities over the duration of the experiment are depicted in FIG. 5 for Reactor 1 and in FIG. 6 for Reactor 2, being plots of reactor productivity (in mg. cresol removed per $m^2$ per hour).

Figure 5:
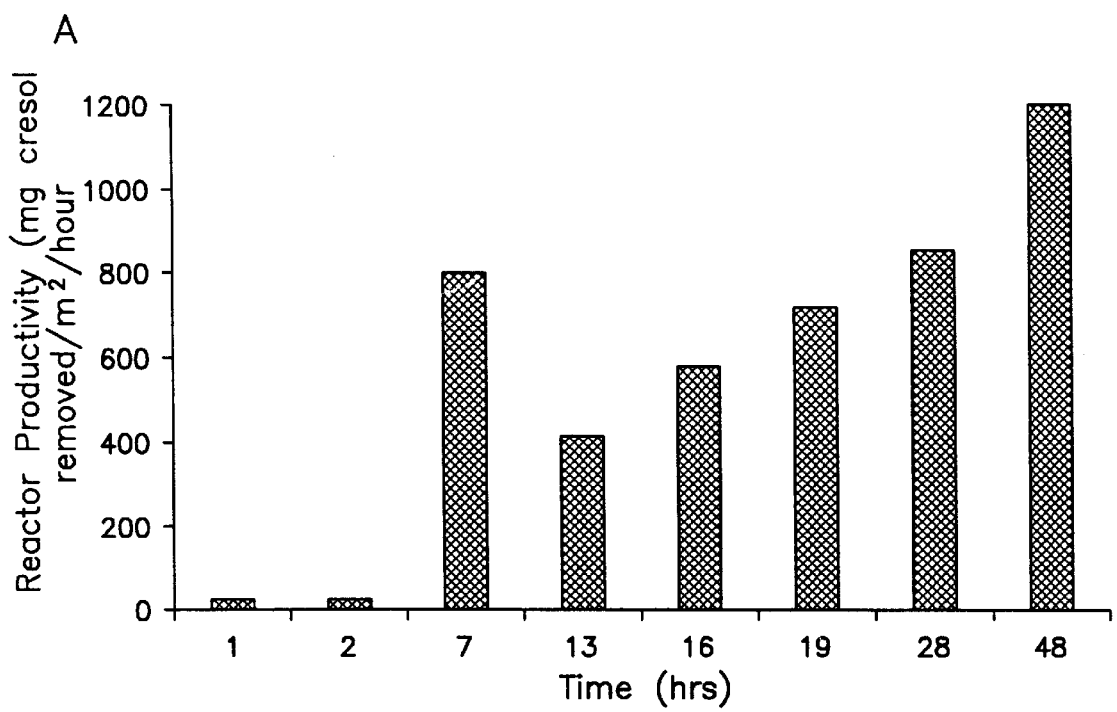
Figure 6:
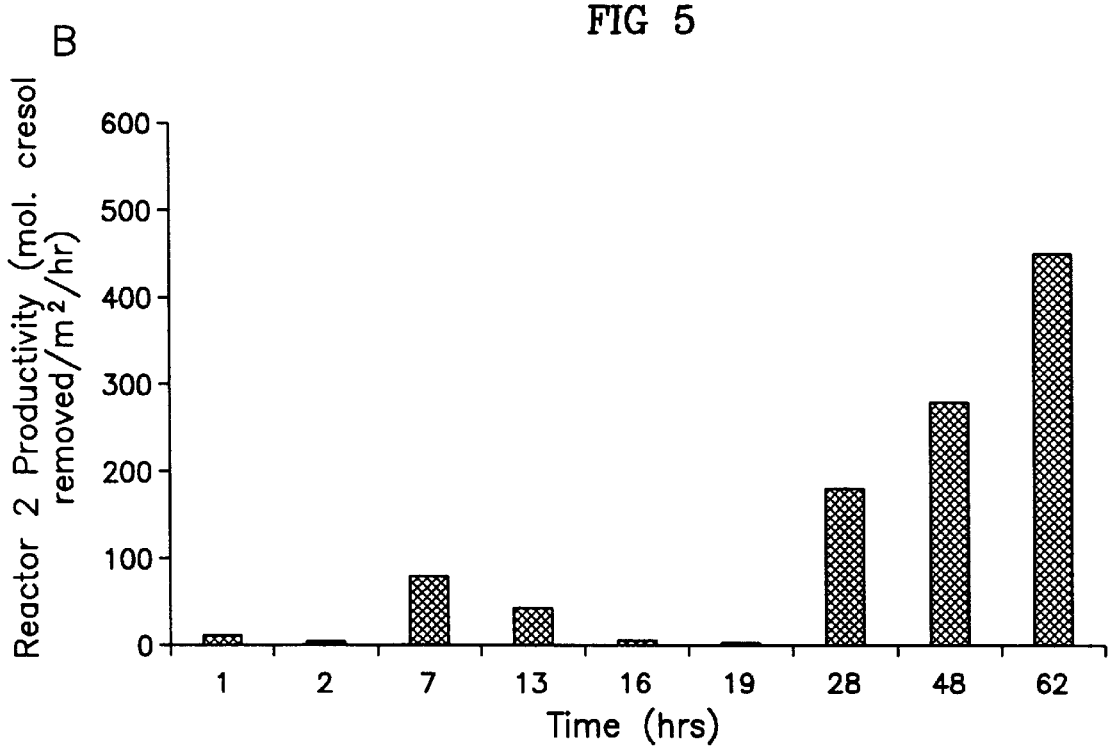

In FIG. 5 (Reactor 1) an initial lag period in productivity is noticeable. This is followed by a period of apparently exponential increase in productivity over time. This contrasts with the bioreactor efficiency results. A similar trend can be observed in FIG. 6 (Reactor 2). In this case the bioreactor productivity shows a similar trend to bioreactor efficiency in that the supply of fresh medium has an enhancing effect. Since these responses are transient this suggests that the biofilm is not in steady state, but is constantly changing as a result of changes in the feed medium.

Samples of the effluent from Reactor 2 which were allowed to stand for 24 hours showed no trace of cresol, indicating that the ligninolytic enzymes and/or the biomass washed out of the reactor are still active in removal of cresol.

Further reductions in cresol concentrations of 0–30% were observed in the effluent of Reactor 1 after 24 hours. Although this still leaves a significant amount of cresol remaining, the reactor is a relatively high throughput one, so that the reactor effluent could easily be recycled until complete removal is achieved.

Bioreactor performance is affected by flux and by pH and redox potential.

Figure 7:
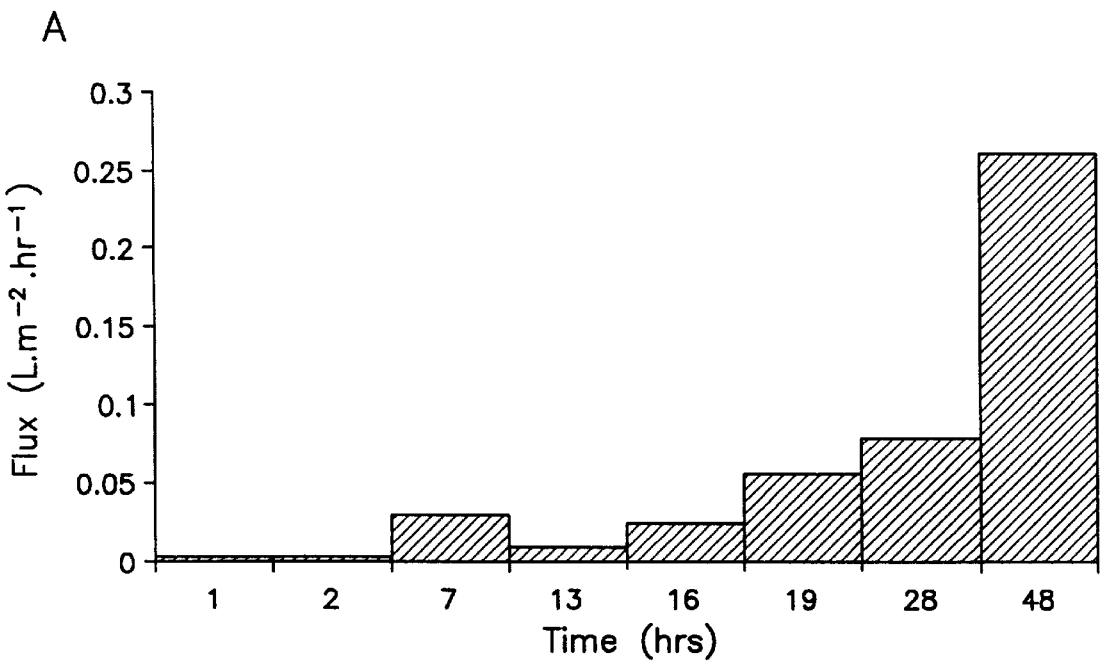
Figure 8:
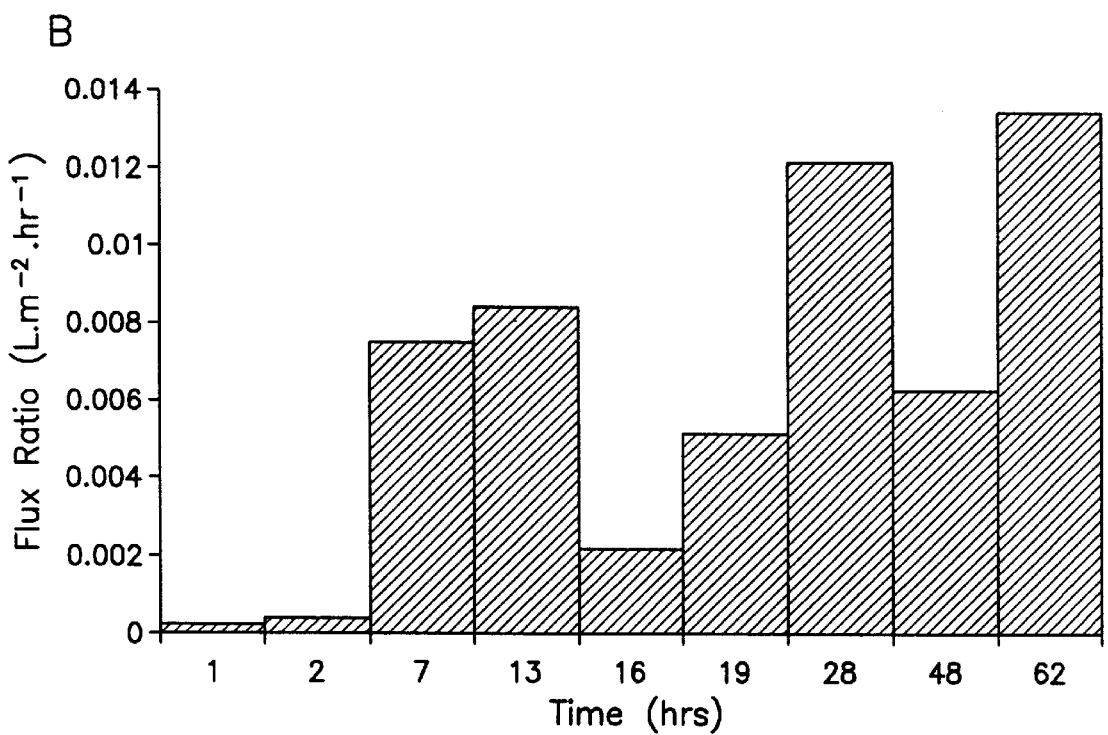
Figure 9:
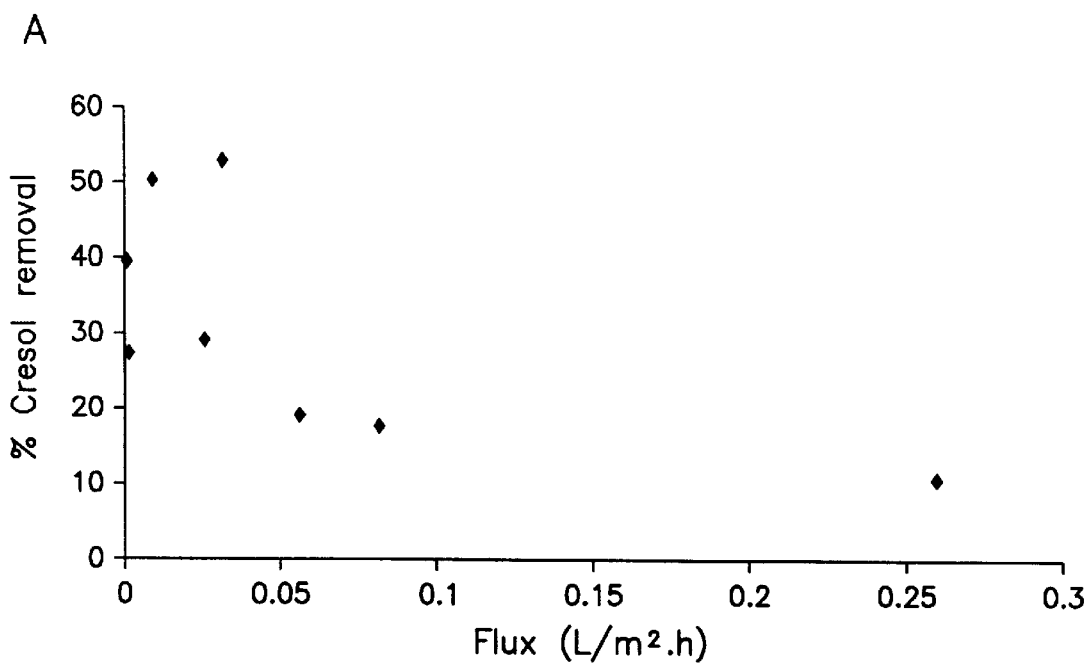
Figure 10:
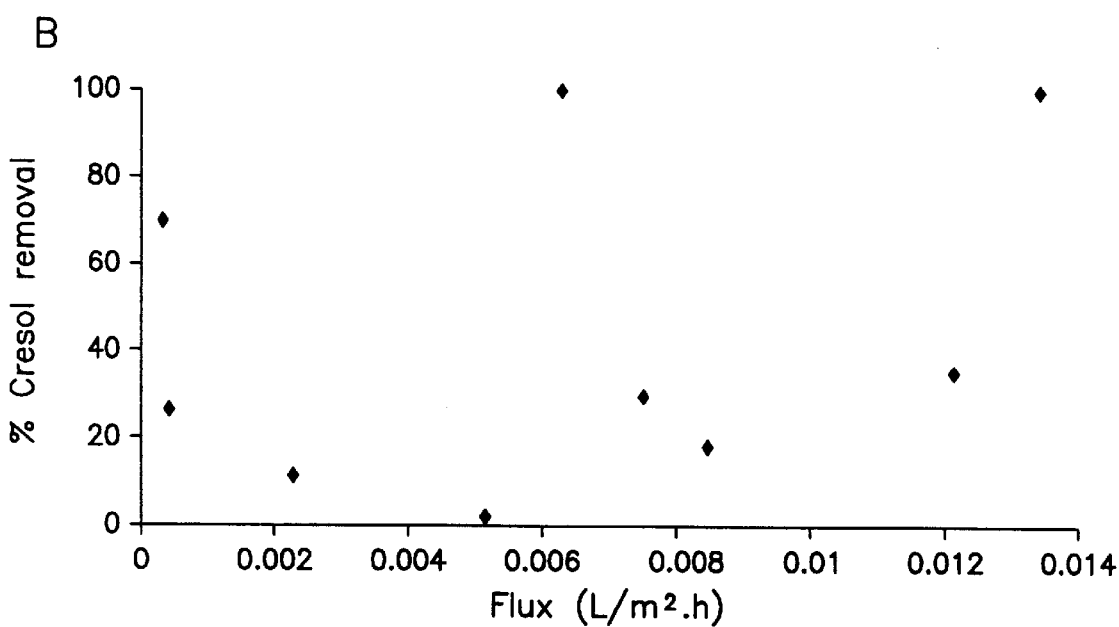
Figure 11:
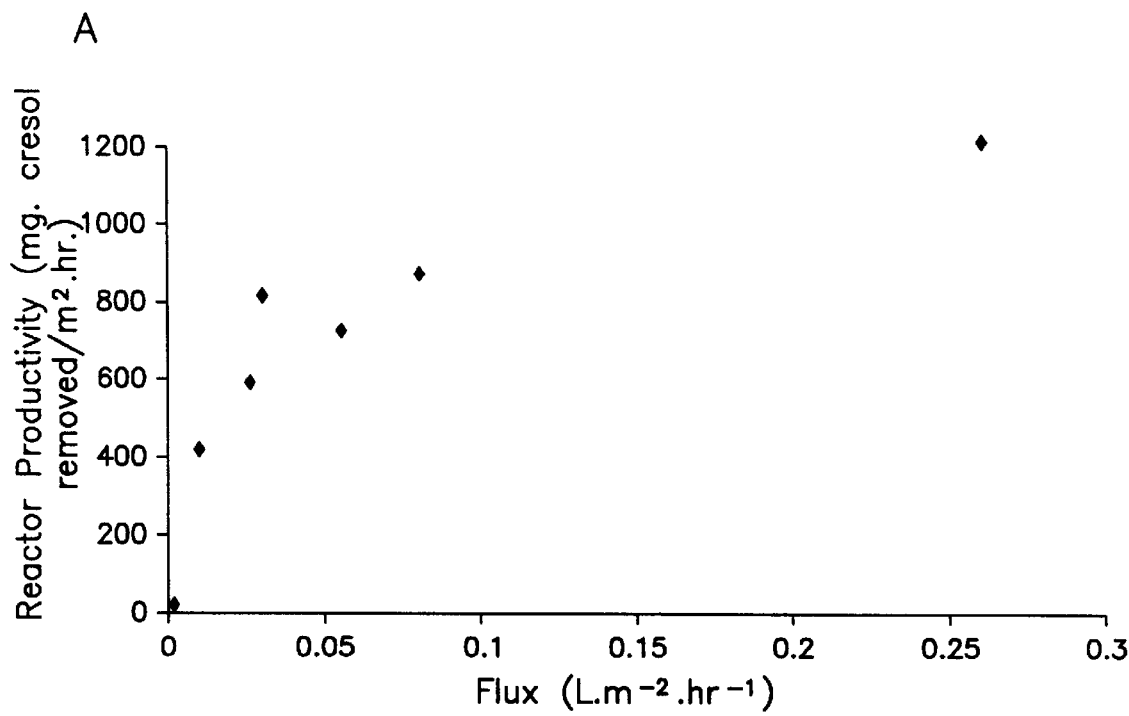
Figure 12:
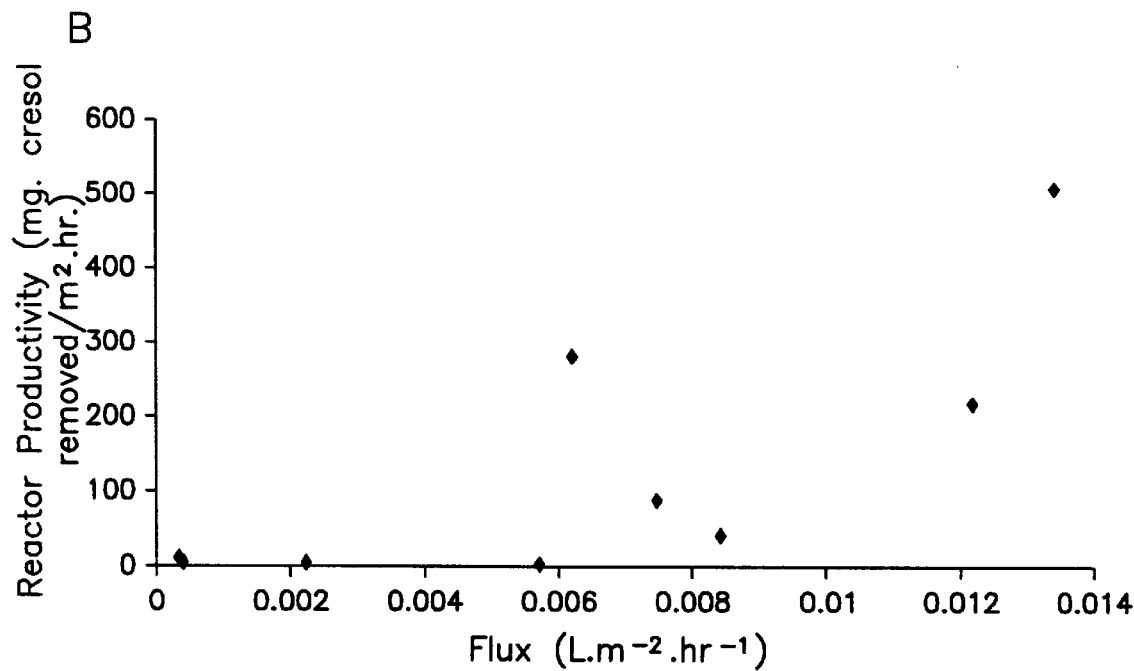
Figure 13:
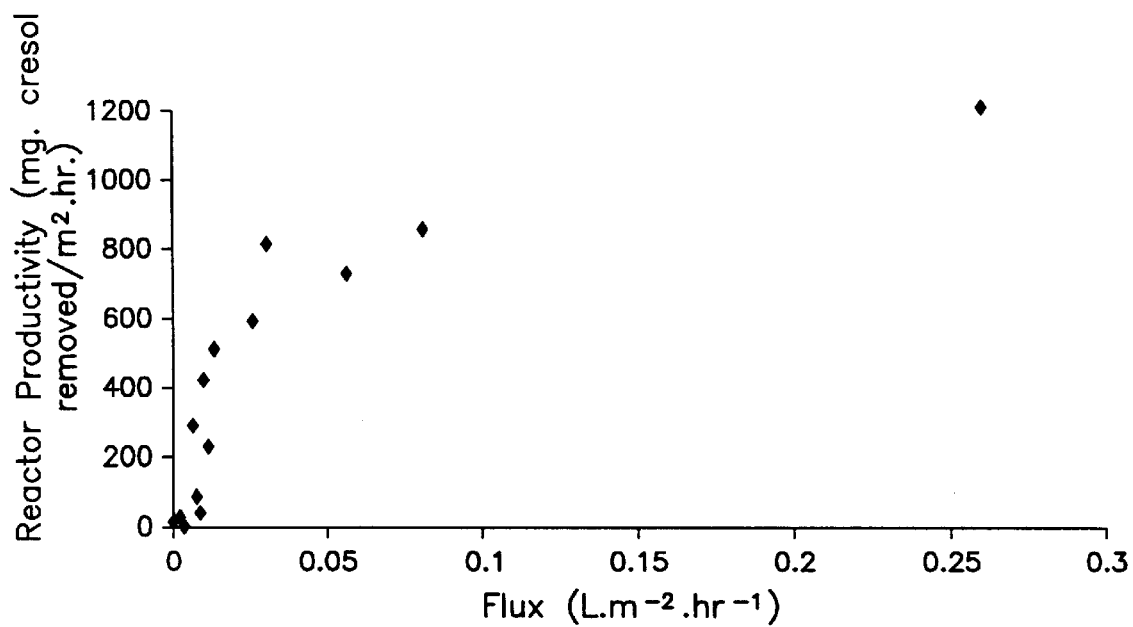

The effect of flux: The medium supply rates of both reactors was not changed but the flux was allowed to chance on its own throughout the experiment so that the effects of different trans-membrane flux rates could be determined. The flux changes observed over time during the experiment are shown in FIG. 7 for Reactor 1 and in FIG. 8 for Reactor 2, being plots of flux (in liters per $m^2$ per hour) against time (in hours). As shown in FIGS. 7 and 8, quite significant flux increases were observed in both reactors. The effect of different flux rates on bioreactor performance is shown in FIGS. 9 to 13. The % cresol removal as a function of flux (in liters per $m^2$ per hour) is shown in FIG. 9 for Reactor 1, and in FIG. 10 for Reactor 2. The reactor productivity (in mg. cresol removed per $m^2$ per hour) as a function of flux (in liters per $m^2$ per hour) is shown in FIG. 11 for Reactor 1 and in FIG. 12 for Reactor 2.

FIG. 9 (Reactor 1) indicates that efficiency increases with increasing flux rate up to a rate of about 0.02.5 $l.m^{-2}.hr^{-1}$. Thereafter a non-linear drop in cresol removal is observed with increasing flux rates. This trend is not observed in FIG. 10 (Reactor 2). This implies that some important operating parameter other than flux has a major influence on degradation efficiency.

Combining the results from Reactor 1 and Reactor 2 (FIG. 13) provides a clearer demonstration of the relationship between flux and reactor productivity. Very low productivities are attained at extremely low fluxes (<0.005 $l.m^{-2}.hr^{-1}$). Peak productivity seems to be in the range of 1000 $mg.m^{-2}.hr^{-1}$, attained at flux rates of above 0.1 $l.m^{-2}.hr^{-1}$. Peak productivity seems to be in the range of 1000 $mg.m^{-}2.hr^{-1}$ attained at flux rates of above 0.1 $l.m^{-2}hr.^{-1}$. The relationship between flux and productivity provides valuable information on operating conditions in terms of flux and membrane surface area required to achieve a given productivity of cresol removal.

Effect of pH and redox potential: To determine whether the changes in efficiency and productivity were due to changes in the environment caused by fungal metabolism (the fungus has been shown to decrease the medium pH and raise the redox potential of the medium), reactor efficiency and productivity was compared to pH and redox potential. The effects of pH and redox potential were found to be complex. In summary, it was found that:

(1) in Reactor 1 (high flux conditions), productivity was directly related to medium redox potential and inversely related to medium pH. The opposite was found for reactor efficiency in that an inverse relationship was found between redox potential and efficiency and a direct relationship between pH and efficiency.

(b) In Reactor 2 (low flux conditions) there was a direct relationship between medium redox potential and both productivity and removal efficiency. An inverse relationship was found between pH and both productivity and efficiency.

The results of the experimental work have shown that when using a synthetic effluent, several factors play an important role in the performance of the system tested. The most important of these seems to be flux. Under conditions of high flux (above 0.01 $l.m^{-2}.hr^{-1}$ in the case of the particular medium used) flux is directly proportional to productivity and inversely proportional to efficiency. Under conditions of low flux (<0.01 $l.m^{-2}.hr^{-1}$) both productivity and efficiency are directly proportional to flux. This is because theoretically the flux rate is directly proportional to the amount of nutrients supplied to the fungal biofilm and nutrient supply seems to be another important operational parameter in using this system.

It was found that cresol removal efficiency of 100% could be achieved at a productivity of 508 mg. of cresol removed per $m^2$ per hour. This means that 113 l of 100 ppm p-Cresol-containing synthetic effluent can be treated per day in a single pass operation using a 1 $m^2$ reactor. Greater throughput can be achieved by operating the reactor in recycle mode at higher fluxes.

What is claimed is:

1. A method of producing a secondary metabolite which method comprises:

providing a porous substratum which has a biofilm of micro-organism attached thereto;

causing a nutrient solution to flow through the substratum, at a rate which is sufficiently low for a nutrient gradient to be established across the biofilm, such that the nutrient concentration at a high level along the gradient is sufficiently high to support primary growth of the micro-organism, and the nutrient concentration as a low level along the gradient is sufficiently low to induce secondary metabolism in the microorganism, thereby to produce secondary metabolite on a continuous basis.

2. A method according to claim 1, wherein the substratum is in the form of a hollow fibre membrane, with the biofilm being on the outside of the membrane.

3. A method according to claim 2, wherein the hollow fibre membrane has a relatively thin, porous skin on the inside, and a relatively thick, finger-like, externally unskinned void structure radiating outwardly from the skin.

4. A method according to claim 3, wherein the hollow fibre membrane has an outside diameter of about 2 mm, a porous skin having a thickness of about 1 μm and a void structure having a thickness of about 300 μm.

5. A method according to claim 1, wherein the outside of the biofilm is contacted with an oxygen-containing gas to provide oxygen for metabolism.

6. A method according to claim 5, wherein the oxygen-containing gas is air.

7. A method according to claim 5, wherein the oxygen-containing gas is blown over the outside surface of the biofilm, to carry away spores and dead cells of the micro-organism.

8. A method according to claim 1, wherein the micro-organism is a filamentous fungus.

9. A method according to claim 8, wherein the filamentous fungus is *Phanerochaete chrysosporium*.

10. A method of treating nutrient-containing waste water containing organic pollutants, through the activity of secondary metabolites, which method comprises:

providing a porous substratum which has a biofilm of micro-organism attached thereto;

causing the waste water to flow through the substratum, at a rate which is sufficiently low for a nutrient gradient to be established across the biofilm, such that the nutrient concentration at a high level along the gradient is sufficiently high to support primary growth of the micro-organism, and the nutrient concentration as a low level along the gradient is sufficiently low to induce secondary metabolism in the microorganism, thereby to produce secondary metabolite on a continuous basis.

11. A method according to claim 10, wherein the substratum is in the form of a hollow fibre membrane, with the biofilm being on the outside of the membrane.

12. A method according to claim 11, wherein the hollow fibre membrane has a relatively thin, porous skin on the inside, and a relatively thick, finger-like, externally unskinned void structure radiating outwardly from the skin.

13. A method according to claim 12, wherein the hollow fibre membrane has an outside diameter of about 2 mm, a porous skin having a thickness of about 1 μm and a void structure having a thickness of about 300 μm.

14. A method according to claim 10, wherein the outside of the biofilm is contacted with an oxygen-containing fluid to provide oxygen for metabolism.

15. A method according to claim 14, wherein the oxygen-containing fluid is air.

16. A method according to claim 14, wherein the oxygen-containing fluid is a gas which is blown over the outside surface of the biofilm, to carry away spores and dead cells of the micro-organism.

17. A method according to claim 10, wherein the micro-organism is a filamentous fungus.

18. A method according to claim 17, wherein the filamentous fungus is *Phanerochaete chrysosporium*.

* * * * *